J. P. MONNETT.
Harvester-Rake.
No. 161,540. Patented March 30, 1875.
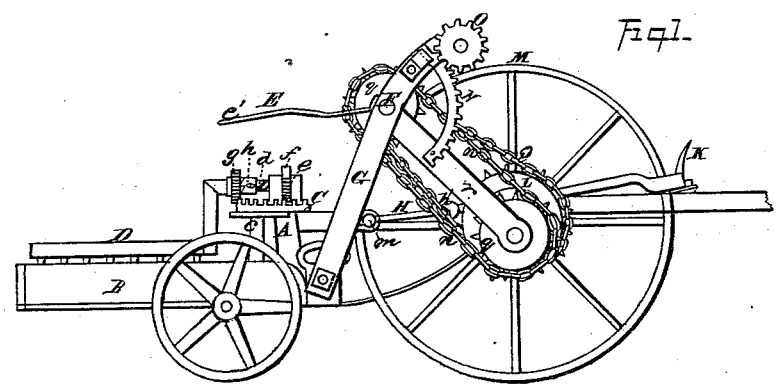
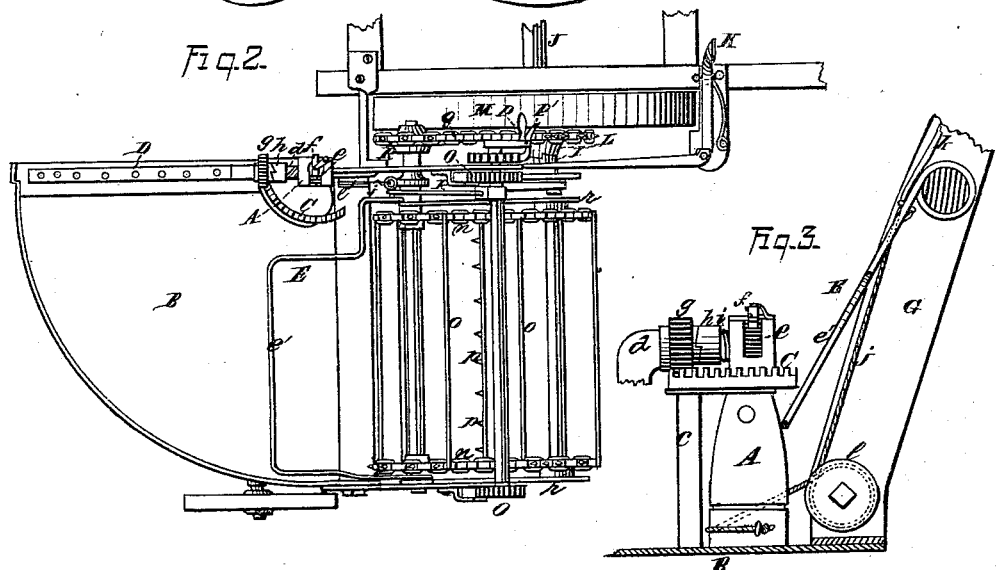
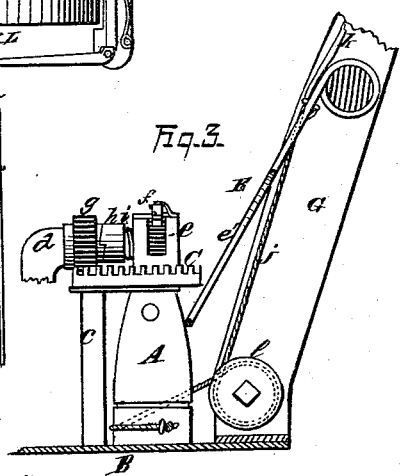
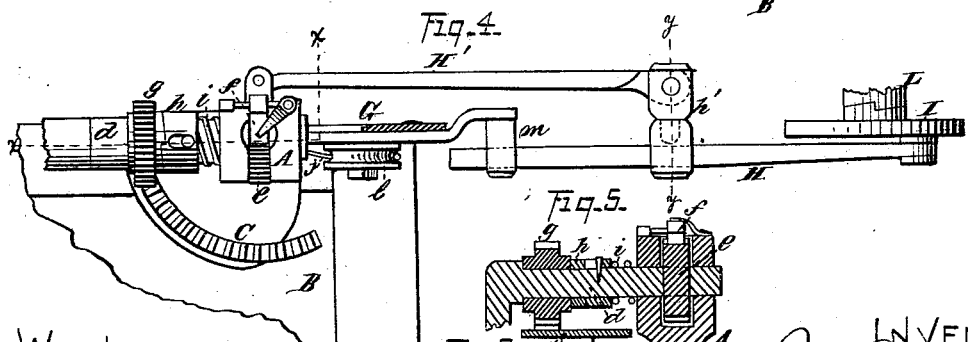
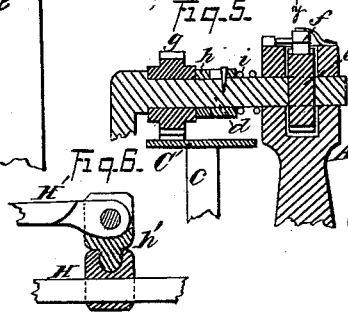

UNITED STATES PATENT OFFICE.

JOHN P. MONNETT, OF BUCYRUS, OHIO.

IMPROVEMENT IN HARVESTER-RAKES.

Specification forming part of Letters Patent No. 161,540, dated March 30, 1875; application filed February 6, 1875.

*To all whom it may concern:*

Be it known that I, JOHN P. MONNETT, of Bucyrus, in the county of Crawford and State of Ohio, have invented certain new and useful Improvements in Harvesters; and I do hereby declare that the following is a full, clear, and exact description thereof, which will enable others skilled in the art to which it pertains to make and use the same, reference being had to the accompanying drawing and to the letters of reference marked thereon, which form a part of this specification, in which—

Figure 1 is a side elevation of my improved harvester, and Fig. 2 is a plan view thereof. Fig. 3 is a detached view of the cut-off, &c. Fig. 4 is a like view, in plan, of the pitman and operating mechanism of the rake. Fig. 5 is a vertical section through the dotted line $x\ x$ of Fig. 4, and Fig. 6 is a similar view through the dotted line $y\ y$ of Fig. 5.

Corresponding parts in the several figures are denoted by like letters of reference.

This invention relates to a certain improvement in harvesters; and it consists of a vibrating post with a toothed track or sector, upon which is journaled the rake, the axis of which is provided with a ratchet engaged by a pawl, and a loose cog and clutch for coupling the cog thereto; secondly, of a cut-off for preventing the grain being cut from falling on the rake, consisting of a hinged or pivoted angular bar or frame depressed by a cord or chain extending to an intermediate pulley, and around the post to which it is attached, it being elevated by a spring; thirdly, of the rake-operating pitman, which consists of two parts or rods, one eccentrically attached at one end to a clutch on the driving-wheel axle, and working in an eye on a bar or rod of one of the gatherer-supporting uprights, or other convenient point, and the other jointed at one end to that just described, and connected to the said post; and, lastly, of a gatherer, whose angle of presentation to the grain may be varied by mechanism, to be hereinafter more fully set forth.

In the annexed drawing, A refers to a vibrating post, pivoted in the grain-platform B, with the toothed track or sector C, which may be supported upon a bar, $c$, fastened to the said platform. Upon this post is journaled the rake D, whose axis $d$, or cranked portion, is provided with a ratchet, $e$, engaged by a spring-pawl, $f$, on the post, and a loose cog, $g$, coupled to the said axis by means of the clutch $h$, actuated by a spring, $i$. After the rake has delivered its sheaf of grain, the loose cog $g$ will have reached the termination of the toothed track or sector C, when the said cog will be coupled to the axis $d$ of the rake by the clutch $h$, and caused to engage the said track, which will elevate the rake, when it will be returned to the forward end of the platform B, by the reversed movement of the post for a second sheaf or gavel. The object of the ratchet and pawl $e\ f$ is to prevent the backward revolution of the axis of the rake as it is moving forward with its sheaf. It will be observed that during the entire sweep of the rake, from the beginning to the end of its movement, it will maintain a parallel plane to the grain-platform, thoroughly removing the grain therefrom. The toothed track or sector C may be located to the opposite side of the post A, and the axis of the rake extended through and beyond the said post, and the loose cog $g$ removed and placed thereon, and the objects of my invention carried out. E is the cut-off, consisting of the angular bar or frame $e'$, hinged or pivoted to the axis F of the gatherer, supported or journaled in uprights G G, attached to the grain-platform B. The angular bar or frame $e'$ is depressed by the winding up of the cord or chain $j$ upon the vibrating post A, so as to prevent the grain being cut from falling on the rake at the beginning of its forward movement, it (the frame $e'$) being elevated as the rake moves forward by the spring $k$, connected to the axis of the crank for adjusting the gatherer, or at some other convenient point. The elevation of the frame $e'$ allows the grain to fall on the platform, which is kept from falling on the rake. The cord or chain $j$ extends and is fastened to a pulley, $l$, whose axis is journaled in one of the uprights G G before passing to the vibrating post, to enable it to be wound around the latter. The rake-operating pitman consists of the rods H H', one, H, eccentrically attached at one end to a clutch, I, on the driving-wheel axle J, and working in an eye, $m$, on a bar or rod of one of the gatherer-supporting uprights G G, or other convenient point, and the other, H', jointed, as shown at h' in Fig. 6, to the rod H, and curved and connected to the said post A, to which it imparts a rotary movement, the post, in turn, moving the rake in the arc of a circle, both forward and backwardly. By means of this form of pitman, the operation of the operative mechanism of the rake is insured, and a substantial means for transmitting motion from the driving-wheel or motor to the rake furnished. A foot-lever, K, fulcrumed to the frame upon which the driver's seat is or may be supported in any known way, is suitably connected to, and is for the purpose of engaging the clutch I with, the clutch on the cog L, fast to the driving-wheel M, of which there are two. When the foot is removed from the lever K, a spring retracts the clutch I from the cog-clutch, throwing the rake out of operation. The gatherer, which is composed of endless chain-belts n n, attached to and between which are placed transverse rods or slats o o, with or without teeth p p, and toothed or cogged wheels q q, around which the said belts pass, and which revolve on axes connected together by side bars r r, is hung, as shown in the drawing, upon or in the uprights G G, above alluded to, and provided with the toothed segmental bars N N, gearing with the pinions O O, with their axis journaled in the uprights G G, and provided with a crank and pawl or detent, P P'. By operating the crank P, the detent being first disengaged from its pinion, the angle of presentation of the gatherer to the grain may be varied at pleasure, or the gatherer so adjusted as to present the grain at about an angle of forty-five degrees to the cutter-bar, by which the grain, when cut, will be caused to fall toward, and carried by the moving slats or bars of the gatherer upon, the grain-platform. An endless chain or belt, Q, passing around the cog L and a cog, R, of the gatherer, imparts or transmits motion to the latter.

Having thus described my invention, what I claim, and desire to secure by Letters Patent, is—

1. The vibrating post A and the stationary toothed track or sector C, in combination with the rake D, with its cranked portion or axis d provided with the ratchet e, engaged by a pawl, f, and the loose cog g, and clutch h, substantially as and for the purpose set forth.

2. The cut-off device consisting of the pivoted angular bar or frame e', depressed by the cord or chain j, pulley l, and vibrating post A, and elevated by a spring, k, substantially as shown and described, and for the purpose set forth.

3. The pitman H H' h' and eye m, in combination with the clutch I and vibrating post A, substantially as and for the purpose set forth.

4. The combination, with the gatherer n o q r, of the uprights G G, segmental toothed or rack bars N N, pinions O O, and crank and pawl P P', substantially as and for the purpose set forth.

In testimony that I claim the foregoing as my own I affix my signature in presence of two witnesses.

JNO. P. MONNETT.

Witnesses:
W. R. EDELEN,
J. W. WISTER.